United States Patent
Hwang et al.

(10) Patent No.: US 12,006,595 B2
(45) Date of Patent: Jun. 11, 2024

(54) METHOD FOR PRODUCING CARBON FIBER

(71) Applicant: FORMOSA PLASTICS CORPORATION, Kaohsiung (TW)

(72) Inventors: Long-Tyan Hwang, Kaohsiung (TW); Chia-Chi Hung, Kaohsiung (TW); Kun-Yeh Tsai, Kaohsiung (TW); Ching-Wen Chen, Kaohsiung (TW); Wen-Ju Chou, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 0 days.

(21) Appl. No.: 17/895,949

(22) Filed: Aug. 25, 2022

(65) Prior Publication Data
US 2023/0082504 A1    Mar. 16, 2023

(30) Foreign Application Priority Data
Aug. 25, 2021   (TW) ................................ 110131548

(51) Int. Cl.
*C08F 2/06*      (2006.01)
*C08F 4/04*      (2006.01)
(Continued)

(52) U.S. Cl.
CPC .............. *D01F 9/22* (2013.01); *C08F 220/48* (2013.01); *D01F 6/36* (2013.01); *D01F 9/225* (2013.01);
(Continued)

(58) Field of Classification Search
CPC ...... C08F 2/06; C08F 4/04; C08F 4/34; C08F 220/44; C08F 220/46; C08F 2800/20;
(Continued)

(56) References Cited

U.S. PATENT DOCUMENTS

| 2,771,461 A | * | 11/1956 | Weinstock, Jr. | ...... | C08F 220/44 |
| | | | | | 526/329.3 |
| 3,738,972 A | * | 6/1973 | Moriyama et al. | ... | C08F 212/10 |
| | | | | | 526/73 X |

(Continued)

FOREIGN PATENT DOCUMENTS

| CN | 101205280 A | | 6/2008 | |
| CN | 101805936 A | * | 8/2010 | ................ C08F 2/06 |

(Continued)

OTHER PUBLICATIONS

Translation of CN 101805936 A (published on Aug. 18, 2010).*

*Primary Examiner* — Leo B Tentoni
(74) *Attorney, Agent, or Firm* — MUNCY GEISSLER OLDS & LOWE P.C.

(57) ABSTRACT

The present invention relates to a method for producing a carbon fiber. In the method for producing the carbon fiber, a high pure acrylonitrile monomer with specific contents of impurities and a comonomer are used to produce an acrylonitrile copolymer, and the acrylonitrile copolymer is subjected to a spinning operation, a stretching operation, an oxidation treatment and a carbonization treatment in sequence, for obtaining the carbon fiber. The acrylonitrile copolymer with an appropriate falling-ball viscosity and an appropriate weight-average molecular weight is beneficial to the spinning operation, thereby reducing an inner pore diameter and enhancing strength of the resulted carbon fiber.

15 Claims, 2 Drawing Sheets

(51) Int. Cl.
*C08F 4/34* (2006.01)
*C08F 220/44* (2006.01)
*C08F 220/46* (2006.01)
*C08F 220/48* (2006.01)
*C08L 33/20* (2006.01)
*D01D 1/02* (2006.01)
*D01D 5/06* (2006.01)
*D01D 5/12* (2006.01)
*D01D 10/02* (2006.01)
*D01D 10/06* (2006.01)
*D01F 1/02* (2006.01)
*D01F 1/10* (2006.01)
*D01F 6/36* (2006.01)
*D01F 6/38* (2006.01)
*D01F 9/22* (2006.01)
*C08K 3/08* (2006.01)
*D06M 101/28* (2006.01)

(52) U.S. Cl.
CPC .... *C08F 2800/20* (2013.01); *C08K 2003/085* (2013.01); *C08K 2003/0856* (2013.01); *D06M 2101/28* (2013.01)

(58) Field of Classification Search
CPC ...... C08K 2003/085; C08K 2003/0856; C08L 33/20; D01D 1/02; D01D 5/06; D01D 5/12; D01D 5/16; D01D 10/02; D01D 10/06; D01F 1/02; D01F 1/10; D01F 6/38; D01F 9/22; D01F 9/225; D06M 2101/28
USPC ........ 264/29.2, 29.7, 82, 182, 210.6, 211.14, 264/211.15, 211.17, 234, 331.16, 342 RE; 423/447.4, 447.8; 8/115.51, 115.6; 524/781, 785; 525/221, 238, 540; 526/73, 318.2, 342
See application file for complete search history.

(56) References Cited

U.S. PATENT DOCUMENTS

| | | | |
|---|---|---|---|
| 3,839,288 A * | 10/1974 | Melacini | C08F 20/44 526/342 X |
| 5,286,844 A | 2/1994 | Nishida et al. | |
| 5,708,111 A | 1/1998 | Wilkinson | |
| 2001/0024722 A1* | 9/2001 | Matsuhisa | D01F 9/22 428/367 |
| 2010/0252438 A1* | 10/2010 | Yoshikawa | D01F 9/225 205/159 |
| 2014/0271442 A1* | 9/2014 | Cai | D01F 9/22 525/329.2 |
| 2015/0174807 A1* | 6/2015 | Tang | D01F 9/22 264/29.2 X |
| 2016/0168761 A1* | 6/2016 | Okuda | D01F 9/14 423/447.2 |
| 2016/0263803 A1 | 8/2016 | Cook et al. | |
| 2021/0025082 A1 | 1/2021 | Takechi et al. | |

FOREIGN PATENT DOCUMENTS

| | | |
|---|---|---|
| CN | 102199104 A | 9/2011 |
| CN | 102199105 A | 9/2011 |
| CN | 108823683 A | 11/2018 |
| CN | 109810222 A | 5/2019 |
| CN | 110685030 A | 1/2020 |
| JP | S56-022756 A | 3/1981 |
| JP | 2010174422 A | 8/2010 |
| JP | 2012-017461 A | 1/2012 |
| JP | 2012072248 A | 4/2012 |
| JP | 2016-516842 A | 6/2016 |
| JP | 2017-503066 A | 1/2017 |
| TW | I553175 B | 10/2016 |
| TW | I654240 B | 3/2019 |
| WO | WO-2009/060653 A1 | 5/2009 |
| WO | WO-2015/016199 A1 | 2/2015 |

* cited by examiner

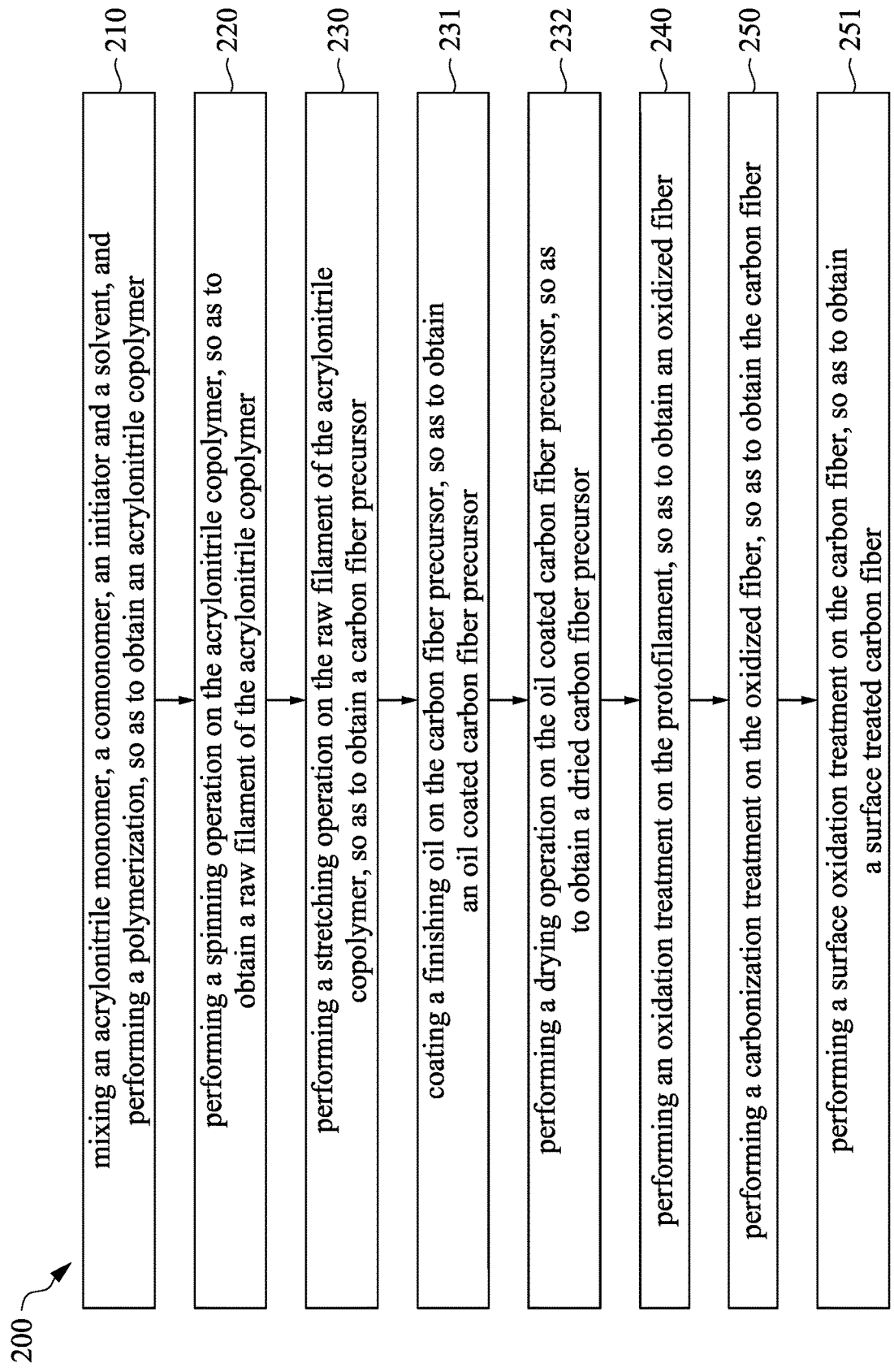

METHOD FOR PRODUCING CARBON FIBER

RELATED APPLICATION

This application claims priority to Taiwan Application Serial Number 110131548, filed Aug. 25, 2021 which is herein incorporated by reference.

BACKGROUND

Field of Invention

The present invention relates to a method for producing carbon fiber, and more particularly relates to the method for producing the carbon fiber by using an acrylonitrile monomer with a high purity.

Description of Related Art

A carbon fiber is a fibrous carbon material, its strength is higher than that of steel, and its density is lower than that of aluminium, its corrosion resistance is better than that of stainless, the high-temperature resistance is better than that of heat-resistant steel, and it can conduct electricity as copper can. Since the carbon fiber has excellent performance and environment compatibility, it is widely used in sport, leisure, wind power and aerospace industries, in which a polyacrylonitrile (PAN)-based carbon fiber gets an attention of public.

Conventionally, in a method for producing a PAN-based carbon fiber, a spinning is first performed for obtaining a raw filament of the acrylonitrile copolymer, then washing, stretching, coating a finishing oil, and drying are performed for obtaining a carbon fiber precursor. Next, the carbon fiber precursor is subjected to an oxidation, a carbonization and a surface treatment, so as to obtain the PAN-based carbon fiber.

Recently, demand for the PAN-based carbon fiber is gradually increasing, and accordingly the methods for mass-producing the PAN-based carbon fiber continue to be developed. For example, the PAN-based carbon fiber is rapidly produced by increasing spinning speed or hammer count, and by using rapid production conditions (e.g., shortening washing time). Although these methods can increase output, in spinning operation, a coagulation of the filament occurs, and metallic impurities exist. Thus, a quality of the resulted PAN-based carbon fiber is reduced. Therefore, a method for purifying the raw filament of the acrylonitrile copolymer by ion-exchange resin is developed for removing the metallic impurities. However, a purifying period by the ion-exchange resin is long and a lot of solvent needs to be used, thus a production time is extended and a cost is increased.

In view of these, it is necessary to develop a method for producing the carbon fiber, so as to solve the aforementioned drawbacks of the well-known methods for producing the carbon fiber.

SUMMARY

Accordingly, an aspect of the present invention is to provide a method for producing carbon fiber. In the method, a high pure acrylonitrile monomer with specific contents of impurities and a comonomer are used to produce an acrylonitrile copolymer. Since the acrylonitrile copolymer has an appropriate falling-ball viscosity and an appropriate weight-average molecular weight, which is beneficial to the spinning operation, an inner pore diameter of the resulted carbon fiber is reduced and strength of the resulted carbon fiber is enhanced.

According to an aspect of the present invention, a method for producing carbon fiber is provided. In the method, an acrylonitrile monomer, a comonomer, an initiator and a solvent are mixed, and a polymerization is performed, so as to obtain an acrylonitrile copolymer, in which the acrylonitrile monomer includes impurities comprising water, methylpropenenitrile, propionylnitrile, oxazole, 4-methoxyphenol, butenone and (meth)acrylic acid alkyl ester. Based on a weight of the acrylonitrile monomer as 100 weight percent (wt. %), a content of the acrylonitrile is more than 99.93 wt. %, and based on the content of the acrylonitrile monomer as $1\times10^6$ ppm, a content of the water is less than 600 ppm, a content of the methylpropenenitrile is less than 2 ppm, a content of the propionylnitrile is less than 1 ppm, a content of the oxazole is less than 2 ppm, a content of the 4-methoxyphenol is less than 40 ppm, a content of the butenone is less than 2 ppm, and a content of the (meth)acrylic acid alkyl ester is less than 1 ppm. Then, a spinning operation is performed on the acrylonitrile copolymer, so as to obtain a raw filament of the acrylonitrile copolymer, in which a falling-ball viscosity of the acrylonitrile copolymer is 550 seconds to 700 seconds. A stretching operation is performed on the raw filament of the acrylonitrile copolymer, so as to obtain a carbon fiber precursor. Then, an oxidation treatment is performed on the carbon fiber precursor, so as to obtain oxidized fiber. Next, a carbonization treatment is performed on the oxidized fiber, so as to obtain the carbon fiber.

According to one embodiment of the present invention, based on a total weight of the acrylonitrile monomer and the comonomer as 100 wt. %, a content of the acrylonitrile monomer is 98.0 wt. % to 99.8 wt. %, and a content of the comonomer is 0.2 wt. % to 2.0 wt. %.

According to another embodiment of the present invention, the acrylonitrile monomer further comprises iron and/or copper, and based on the content of the acrylonitrile monomer as $1\times10^6$ ppm, a content of the iron is less than 0.001 ppm, a content of the copper is less than 0.002 ppm.

According to yet another embodiment of the present invention, the polymerization is performed at 60° C. to 70° C. for 4 hours to 6 hours, heated to 70° C. to 80° C. for 1 hour to 3 hours, and maintained for 7 hours to 9 hours.

According to yet another embodiment of the present invention, a weight-average molecular weight of the acrylonitrile copolymer is 380,000 g/mole to 450,000 g/mole, and a molecular weight distribution of the acrylonitrile copolymer is less than 3.5.

According to yet another embodiment of the present invention, a total stretching ratio of the raw filament of the acrylonitrile copolymer is 11.2 to 12.8 after the stretching operation.

According to yet another embodiment of the present invention, after the stretching operation, the method further comprises coating a finishing oil on the carbon fiber precursor, so as to obtain an oil coated carbon fiber precursor.

According to yet another embodiment of the present invention, the method further comprises performing a drying operation on the oil coated carbon fiber precursor, so as to obtain a dried carbon fiber precursor.

According to yet another embodiment of the present invention, the method further comprises performing a surface oxidation treatment on the carbon fiber, so as to obtain a surface treated carbon fiber.

According to yet another embodiment of the present invention, an inner pore diameter of the carbon fiber is less than 10 nm.

In an application of the method for producing the carbon fiber of the present invention, in which the high pure acrylonitrile monomer with the specific contents of impurities and the comonomer are used to produce the acrylonitrile copolymer. The acrylonitrile copolymer is subjected to the spinning operation, the stretching operation, the oxidation treatment and the carbonization treatment in sequence for obtaining the carbon fiber. The acrylonitrile copolymer with the appropriate falling-ball viscosity and the appropriate weight-average molecular weight is beneficial to the spinning operation, thereby reducing the inner pore diameter and enhancing the strength of the resulted carbon fiber.

BRIEF DESCRIPTION OF THE DRAWINGS

Now please refer to description below and accompany with corresponding drawings to more fully understand embodiments of the present invention and advantages thereof. It has to be emphasized that all kinds of characteristics are not drawn in scale and only for illustrative purpose. The description regarding to the drawings as follows:

FIG. 2 illustrates a flow chart of a method for producing carbon fiber according to another embodiment of the present invention.

DETAILED DESCRIPTION

Figure 1:
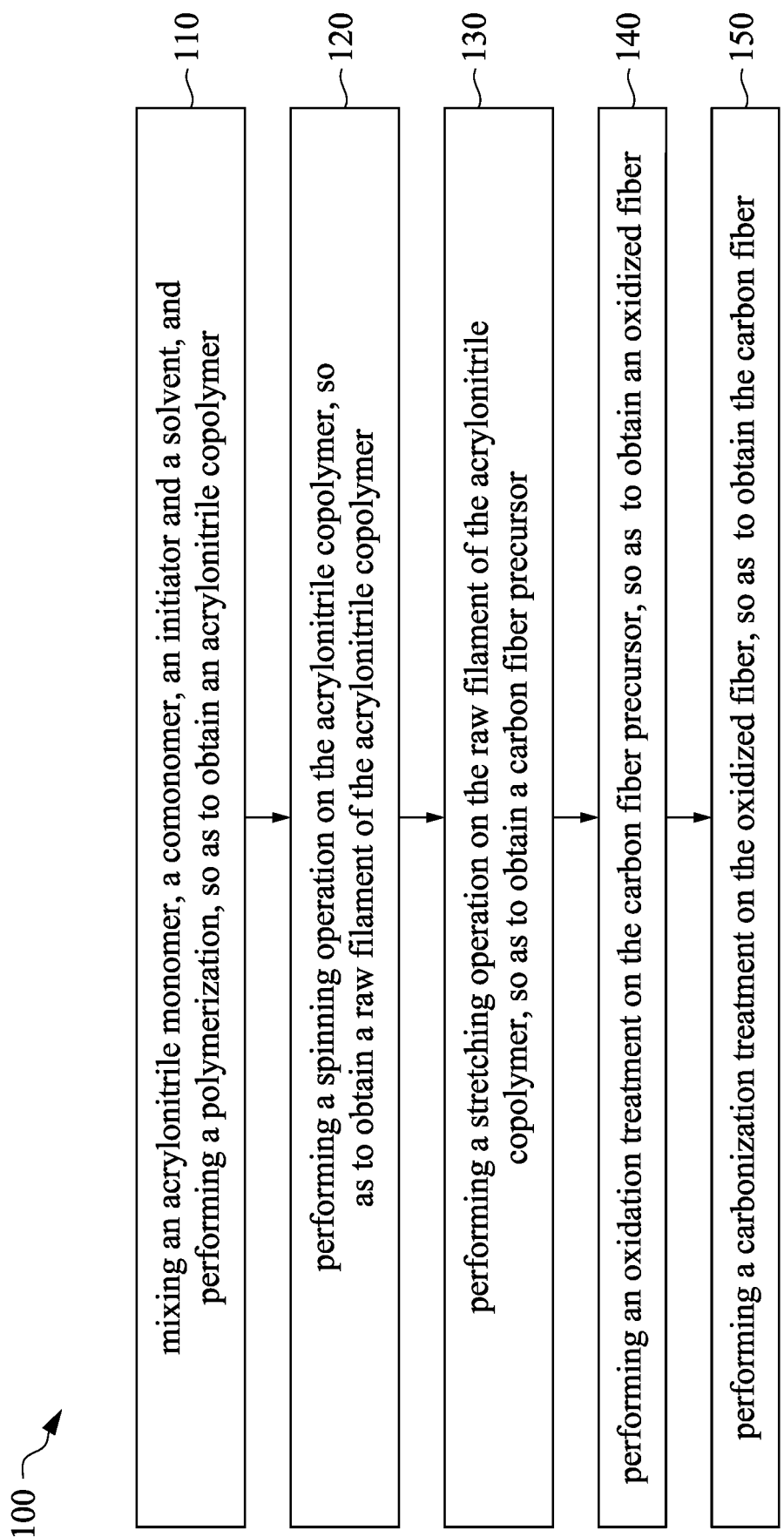
FIG. 1 illustrates a flow chart of a method for producing carbon fiber according to one embodiment of the present invention.

The terms of a singular form in the present specification may include plural forms unless referred to the contrary.

A manufacturing and usage of embodiments of the present invention are discussed in detail below. However, it could be understood that embodiments provide much applicable invention conception which can be implemented in various kinds specific contents. The specific embodiments discussed are only for illustration, but not be a limitation of scope of the present invention.

In a method for producing a carbon fiber of the present invention, an acrylonitrile copolymer is produced by high pure acrylonitrile monomer with specific contents of impurities and a comonomer for further obtaining the carbon fiber. By controlling the contents of the impurities in the acrylonitrile monomer, the resulted acrylonitrile copolymer with an appropriate falling-ball viscosity and an appropriate weight-average molecular weight is beneficial to a spinning operation, thereby reducing an inner pore diameter and enhancing strength of the resulted carbon fiber.

In a word, in the method for producing the carbon fiber of the present invention, an efficiency of the spinning operation and the strength of the resulted carbon fiber are enhanced by controlling the impurities in raw materials (i.e., the impurities in the acrylonitrile monomer). However, in the conventional method for producing the carbon fiber, the impurities in the acrylonitrile monomer are removed to cause the carbon fiber have good spinnability, which is beneficial to the following spinning operation and enhances the strength of the resulted carbon fiber. However, the aforementioned treatment for removing the impurities increases greatly a processing complexity and extends a processing time, thus it does not meet economical requirements.

Referring to FIG. 1, an acrylonitrile monomer, a comonomer, an initiator and a solvent are mixed, and a polymerization is performed, so as to obtain an acrylonitrile copolymer, as shown in an operation 110. In the method 100 for producing the carbon fiber, an acrylonitrile monomer comprises acrylonitrile and impurities. Based on a weight of the acrylonitrile monomer as 100 weight percent (wt. %), a content of the acrylonitrile is more than 99.93 wt. %. When the content of the acrylonitrile is not in the aforementioned range, the resulted acrylonitrile copolymer has an inappropriate falling-ball viscosity and an inappropriate weight-average molecular weight, which is disadvantageous for the spinning operation, thus strength of the resulted carbon fiber is decreased.

The aforementioned impurities can comprise by-product, residual solvent or catalysts produced in a manufacturing process for producing the acrylonitrile. The impurities comprise water, methylpropenenitrile, propionylnitrile, oxazole, 4-methoxyphenol, butenone and (meth)acrylic acid alkyl ester.

More specifically, based on the content of the acrylonitrile monomer as $1\times10^6$ ppm, a content of the water is less than 600 ppm, and preferably less than 70 ppm. When the content of the water is not in the aforementioned range, in the polymerization, a solubility of the acrylonitrile copolymer in the solvent is poor, and a cross-linked polymer is produced. The cross-linked polymer has an inappropriate falling-ball viscosity and an inappropriate weight-average molecular weight, which is disadvantageous for the spinning operation, thus the strength of the resulted carbon fiber is decreased.

Based on the content of the acrylonitrile monomer as $1\times10^6$ ppm, a content of the methylpropenenitrile is less than 2 ppm, a content of the propionylnitrile is less than 1 ppm, a content of the oxazole is less than 2 ppm, a content of the butenone is less than 2 ppm, a content of the 4-methoxyphenol is less than 40 ppm, a content of the (meth)acrylic acid alkyl ester is less than 1 ppm. When the contents of the methylpropenenitrile, oxazole, butenone, 4-methoxyphenol and (meth)acrylic acid alkyl ester are not in the aforementioned ranges, in a carbonization treatment, a cyclization reaction causes defects insides the carbon fiber enlarge, which enlarges inner pore diameter of the carbon fiber, thus the strength of the resulted carbon fiber is decreased. Preferably, the content of the methylpropenenitrile is less than 1 ppm, and the content of the 4-methoxyphenol is less than 1 ppm.

In some embodiments, the acrylonitrile monomer can selectively comprise iron and copper. Based on the content of the acrylonitrile monomer as $1\times10^6$ ppm, a content of the iron is less than 0.001 ppm, and a content of the copper is less than 0.002 ppm. When the content of the iron and/or the content of the copper is in the aforementioned ranges, the resulted acrylonitrile copolymer has the appropriate falling-ball viscosity and the appropriate weight-average molecular weight, which is beneficial to the spinning operation, thereby reducing the inner pore diameter and enhancing strength of the resulted carbon fiber.

There are no limitations to the comonomer, but it should be achieved the purpose of reacting with the acrylonitrile monomer to perform the polymerization. In some embodiments, the comonomer can be a monomer having unsaturated double bond. A specific example of the aforementioned unsaturated double bond can be vinyl. For example, the comonomer can include, but is not limited to, acrylic acid, methacrylic acid, itaconic acid, allyl sulfonic acid, methallyl sulfonic acid, salts or alkyl esters thereof, and acrylamide and derivatives thereof. Preferably, the comonomer can be the itaconic acid. When the comonomer is the itaconic acid, a hydrophilicity of the acrylonitrile copolymer can be enhanced, so as to increase compactness of the raw filament of the acrylonitrile copolymer, thereby reducing the inner pore diameter and enhancing the strength of the carbon fiber.

Based on a total weight of the acrylonitrile monomer and comonomer as 100 wt. %, the content of the acrylonitrile monomer is 98.0 wt. % to 99.8 wt. %, and a content of the comonomer is 0.2 wt. % to 2.0 wt. %. Preferably, the content of the acrylonitrile monomer is 99.0 wt. % to 99.5 wt. %, and the content of the comonomer is 0.5 wt. % to 1.0 wt. %. When the content of the comonomer is in the aforementioned range, the spinning operation is beneficial, and the compactness of the raw filament of the acrylonitrile copolymer is increased, thus the inner pore diameter of the carbon fiber is reduced, and the strength of the carbon fiber is enhanced.

There are no specific limitations to a kind and a content of the initiator, but it should be achieved the purpose of initiating the polymerization of the acrylonitrile monomer and the comonomer. The initiator can include, but is not limited to, azo compounds and peroxy compounds. Specific examples of the azo compounds can be azobisisobutyronitrile (AIBN), azobis(cyanopentanoic acid) (ACVA), and 2,2'-azobis-(2,4-dimethyl)valeronitrile (ABVN). Specific examples of the peroxy compounds can be dilauroyl peroxide (LPO), ditert-butyl peroxide (TBPO) and diisopropyl peroxydicarbonate (IPP). The aforementioned initiator can be used alone or in combination. In some embodiments, based on the total weight of the acrylonitrile monomer and the comonomer as 100 wt. %, a content of the initiator can be not more than 2 wt. %, and preferably be not more than 0.1 wt. %. When the content of the initiator is in the aforementioned range, a yield of the polymerization of the acrylonitrile monomer and the comonomer is increased.

In addition, there are no specific limitations to a kind and a content of the solvent, but it should be achieved the purpose of dissolving the acrylonitrile monomer, the comonomer and the initiator, and being suitable to the aforementioned polymerization between the monomers. For example, the solvent can include, but is not limited to, dimethylacetamide, dimethyl sulfoxide (DMSO), dimethylformamide or a combination thereof. In some embodiments, a content of the solvent can be three to eight times of a sum of contents of the acrylonitrile monomer and the comonomer. When the content of the solvent is in the aforementioned range, the solvent with the aforementioned content can dissolve the acrylonitrile monomer, the comonomer and the initiator, and the content of the solvent are not too much.

A reaction temperature and a reaction time of the polymerization of the present invention can depend on the kinds and/or the contents of the aforementioned comonomer and the initiator. In some embodiments, the polymerization can be performed by using a single-stage or a multi-stage heating. For example, when polymerizing system comprises the itaconic acid and the azo compounds, the polymerization is performed at 60° C. to 70° C. for 4 hours to 6 hours, then heated to 70° C. to 80° C. for 1 hour to 3 hours, and maintained for 7 hours to 9 hours. Preferably, the polymerization is performed at 65° C. for 5 hours, then heated to 75° C. in 2 hours, and maintained for 8 hours.

The acrylonitrile copolymer produced by the polymerization of the present invention has the falling-ball viscosity of 550 seconds to 700 seconds. When the acrylonitrile copolymer does not have the falling-ball viscosity in the aforementioned range, in the spinning operation, the raw filament of the acrylonitrile copolymer is easily broken up, which extends the processing time, and there exist pores and other defects in an internal structure of the obtained a raw filament of the acrylonitrile copolymer. Therefore, in the following stretching operation, a high total stretching ratio can not be achieved, thereby increasing the inner pore diameter and reducing the strength of the resulted carbon fiber. The aforementioned "total stretching ratio" refers to a "ratio" of a length of the treated carbon fiber precursor to an original length of the original carbon fiber precursor. Preferably, the falling-ball viscosity can be 600 seconds to 650 seconds.

In some embodiments, the acrylonitrile copolymer produced by the polymerization can have the weight-average molecular weight of 380,000 g/mole to 450,000 g/mole, and preferably 390,000 g/mole to 430,000 g/mole. When the molecular weight of the acrylonitrile copolymer is in the aforementioned range, extensibility of the acrylonitrile copolymer is better, and in the spinning operation, the raw filament is not broken up, so as to shorten the processing time, and a structure formed by the raw filament of the acrylonitrile copolymer becomes more compact, so as to reduce the inner pore diameter and enhance the strength of the resulted carbon fiber. In addition, a molecular weight distribution of the acrylonitrile copolymer can be less than 3.5, preferably not more than 2.6, and more preferably less than 2.2.

In detail, "the molecular weight distribution" recited in the present invention is presented by a ratio of the weight-average molecular weight ($M_w$) to a number-average molecular weight ($M_n$). Smaller the ratio is, narrower the molecular weight distribution is. The aforementioned weight-average molecular weight and the number-average molecular weight can be measured by using methods, which are well-used by a person having ordinary skill in the art. In some embodiments, the weight-average molecular weight and the number-average molecular weight can be measured by using gel permeation chromatography (GPC).

Referring to FIG. 1 again, after the aforementioned operation 110, a spinning operation is performed on the acrylonitrile copolymer, so as to obtain a raw filament of the acrylonitrile copolymer, as shown in an operation 120. In some embodiments, after the polymerization, the acrylonitrile copolymer exits in the solvent, and the acrylonitrile copolymer and the solvent refer to a copolymer solution below. The copolymer solution can be condensed into a solution, which has the copolymer with a specific concentration, to perform the following spinning operation. The specific examples of the aforementioned specific concentration of the copolymer can be 10 wt. % to 30 wt. %, and preferably 15 wt. % to 25 wt. %, in which the concentration of the copolymer is analyzed by gas chromatography, and quantitated by peak areas in chromatograms. In some specific examples, in the spinning operation, a melt spinning, a wet spinning, a dry spinning or a dry jet wet spinning can be used. Preferably, in the spinning operation, the wet spinning or the dry jet wet spinning can be used, and the dry jet wet spinning is more preferable. In the dry jet wet spinning, the raw filament of the acrylonitrile copolymer can be compacted, thereby reducing the inner pore diameter and enhancing strength of the resulted carbon fiber.

After the aforementioned operation 120, a stretching operation is performed on the raw filament of the acrylonitrile copolymer, so as to obtain a carbon fiber precursor, as shown in an operation 130. In the stretching operation, in an environment with raising temperature, the raw filament of the acrylonitrile copolymer is stretched to cause the raw filament of the acrylonitrile copolymer thinner, so that the resulted carbon fiber meets requirements of the denier number (or diameter). In some embodiments, a total stretching ratio of the raw filament of the acrylonitrile copolymer after the stretching operation can be 11.2 to 12.8, and preferably 11.6 to 12.0. When the total stretching ratio is in the range above, the resulted carbon fiber meets the requirements of product specifications (e.g., fiber density, denier number (or diameter) and physical strength). In some embodiments, the stretching operation can be performed in several bath tanks with different temperatures for the stretching operation, which starts with a low temperature and ends with a high temperature. For example, the temperature of the stretching operation can be raised from 50° C. to 99° C., and preferably form 60° C. to 95° C. When the raising temperature of the stretching operation meets the aforementioned conditions, stick between the resulted carbon fiber precursors does not occur and good extensibility of the resulted carbon fiber precursor can be maintained.

After the aforementioned operation 130, an oxidation treatment is performed on the carbon fiber precursor, so as to obtain oxidized fiber, as shown in an operation 140. The oxidation treatment is used to cyclic oxidize the carbon fiber precursor to enhance heat resistance and flame retardance of the carbon fiber precursor, thereby being beneficial to the following carbonization treatment. The aforementioned "cyclic oxidization" refers to a "cyclization reaction" between cyano groups in a polyacrylonitrile segment of the carbon fiber precursor and carboxylic acid groups in a segment polymerized by the comonomer. In some embodiments, the oxidation treatment can be performed at 200° C. to 300° C., and preferably 220° C. to 280° C. When the oxidation treatment is performed in the aforementioned range of the temperature, the carbon fiber precursor can be cyclic oxidized efficiently, so as to enhance the heat resistance of the carbon fiber precursor, thereby enhancing the strength of the resulted carbon fiber. In some specific examples, an atmosphere used in the oxidation treatment can include, but is not limited to, air (which includes about 21% of oxygen gas), so as to enhance the heat resistance of the carbon fiber precursor, thereby preventing the carbon fiber precursor from burning to break up in the following carbonization process. In some specific examples, an oxidation time can be 10 minutes to 100 minutes.

During the oxidation treatment, a stretching ratio of the carbon fiber precursor stretched by rollers can be 0.7 to 0.9, so as to prevent the carbon fiber precursor from breaking up. For example, at 220° C. to 280° C., in the air, the carbon fiber precursor is cyclic oxidized, and the stretching ratio of the carbon fiber precursor stretched by the rollers is controlled in a range of 0.7 to 0.9. The aforementioned "stretching ratio" refers to a ratio of a length of the treated carbon fiber precursor to an original length of the original carbon fiber precursor. After the oxidation treatment, the oxidized fiber which meets the requirements of the fiber density is obtained. In some embodiments, the fiber density of the oxidized fiber can be 1.2 g/cc to 1.5 g/cc, preferably 1.25 g/cc to 1.45 g/cc, and more preferably 1.3 g/cc to 1.4 g/cc.

After the aforementioned operation 140, a carbonization treatment is performed on the oxidized fiber, so as to obtain the carbon fiber, as shown in an operation 150. The carbonization treatment is used to carbonize the oxidized fiber, so as to produce the polyacrylonitrile-based carbon fiber. In some embodiments, the carbonization treatment can include a pre-carbonization treatment and a post-carbonization treatment, which both are performed in an environment without oxidizing atmosphere and at a high temperature. During the pre-carbonization treatment and the post-carbonization treatment, a heating is continuously performed to raise temperature. In general, the temperature of the pre-carbonization treatment is less than 1000° C., and the temperature of the post-carbonization treatment is more than 1000° C. For example, under nitrogen atmosphere, the temperature is raised from 300° C. to 800° C., and the pre-carbonization treatment is performed at 1 time of the stretching ratio, then the temperature is raised to 1400° C., and the post-carbonization treatment is performed at 0.95 of the stretching ratio.

Referring to FIG. 2, a method 200 for producing a carbon fiber is substantially similar to that of the method 100 for producing the carbon fiber and differences therebetween reside in that after a stretching operation (i.e., an operation 230), the method 200 for producing the carbon fiber can further comprise a finishing treatment, so as to obtain an oil coated carbon fiber precursor, as shown in an operation 231. In the finishing treatment, the finishing oil is coated on the carbon fiber precursor to forming a protective layer on a surface of the carbon fiber precursor, which reduces a friction between the carbon fiber precursor and the rollers, thereby avoiding a generation of fine hairs. The finishing oil can include, but is not limited to, amino modified silicon-based compounds.

After the operation 231, the method 200 for producing the carbon fiber can further comprise a drying operation, so as to obtain a dried carbon fiber precursor, as shown in an operation 232. In the drying operation, solvent contained in the carbon fiber precursor is removed, so as to be beneficial to the following oxidation treatment and the following carbonization treatment. For example, heating rollers can be used to be contact the carbon fiber precursor, so as to heat the carbon fiber precursor. For removing the solvent contained in the carbon fiber precursor, a temperature of the rollers is higher than boiling points of the solvents.

After the operation 250, the method 200 for producing the carbon fiber can further comprise a surface oxidation treatment on the carbon fiber, so as to obtain a surface treated carbon fiber, as shown in an operation 251. The surface oxidation treatment is used to enhance an adherence between the carbon fiber and a substrate. In some embodiments, the surface oxidation treatment can be performed by means of gas phase or liquid phase.

Preferably, the surface oxidation treatment can be performed by means of the liquid phase (e.g., an electrolytic treatment), so as to be beneficial to mass production. For example, electrolytes used in the electrolytic treatment can include, but are not limited to, sulfuric acid, nitric acid, hydrochloric acid, sodium hydroxide, potassium hydroxide, ammonium nitrate, ammonium sulfate, ammonium persulfate, ammonium bromide, ammonium bicarbonate and/or ammonium carbonate.

In some specific examples, inner pore diameter of the resulted carbon fiber is less than 10 nm, and strength of the resulted carbon fiber is more than 650 kilo-pound per square inch (KSI). Preferably, the inner pore diameter can be less than 9.5 nm, and the strength can be more than 700 KSI. More preferably, the inner pore diameter can be less than 8.5 nm, and the strength can be more than 750 KSI. When the inner pore diameter of the carbon fiber is less than 9.5 nm, correspondingly the strength of the carbon fiber can be more than 700 KSI, therefore being suitable for application in fields of sports, aerospace and transportation. For example, tennis rackets, badminton rackets, components of bicycles, structural parts of airplanes and bodies of high-pressure gas cylinders.

The following embodiments are used to illustrate the applications of the present invention, but they are not used to limit the present invention, it could be made various changes or modifications for a person having ordinary sill in the art without apart from the inspire and scope of the present invention.

Producing of Carbon Fiber

Embodiment 1

In embodiment 1, acrylonitrile monomer and itaconic acid monomer were dissolved in dimethyl sulfoxide, then azobisisobutyronitrile was added into the dimethyl sulfoxide. At 65° C., reaction was performed for 5 hours, then a temperature was raised to 75° C. in 2 hours, the reaction was performed for 8 hours for obtaining a copolymer solution of the acrylonitrile copolymer. Based on a weight of the dimethyl sulfoxide as 100 wt. %, a total content of the acrylonitrile monomer and itaconic acid monomer was 21 wt. %, and based on a total weight of the acrylonitrile monomer and itaconic acid monomer as 100 wt. %, a content of the acrylonitrile monomer was 99.2 wt. %, a content of the itaconic acid monomer was 0.8 wt. %, and a content of the azobisisobutyronitrile was 0.087 wt. %.

The copolymer solution was condensed to a copolymer solution with a copolymer concentration of 19.2 wt. % through a thin-film evaporator. At 30° C., in the air, the condensed copolymer solution was spun into a copolymer filament with a length of about 4 mm through a spinning nozzle, and a diameter of holess of the spinning nozzle was 0.15 mm, and a number of the apertures was 3000. The copolymer filament was cooled to 7° C., and then introduced to a coagulation bath containing aqueous solution with 26 wt. % of dimethyl sulfite for obtaining a raw filament of the acrylonitrile copolymer.

Then, in stretching baths, the raw filament of the acrylonitrile copolymer was stretched for obtaining the carbon fiber precursor, and a total stretching ratio of the carbon fiber precursor was 11.92, in which three bath tanks were used in the stretching bath. From a first bath tank to a third bath tank, the temperature was raising from 60° C. to 95° C. Next, the stretched carbon fiber precursor was passed through a finishing oil bath (i.e., an aqueous emulsifying solution with 3 wt. % of amino modified silicon-based compounds) for obtaining an oil coated carbon fiber precursor. Then, the oil coated carbon fiber precursor was dried and compacted by rollers with a temperature of 155° C. Next, in water vapor with a pressure of 3.6 kgf/cm 2, the aforementioned carbon fiber precursor was stretched to 4 times of length for obtaining a dried carbon fiber precursor of which monofilament had a denier of 1 d.

In the air of 220° C. to 280° C., the dried carbon fiber precursor was oxidized for 10 minutes to 100 minutes, and stretched to 0.87 of stretching ratio for obtaining an oxidized fiber with a fiber density of 1.35 g/cc. Under nitrogen atmosphere, at 300° C. to 800° C., the oxidized fiber was pre-carbonized at 1 of stretching ratio for obtaining a pre-carbonized fiber. After the temperature was raised, at 1000° C. to 1400° C., the pre-carbonized fiber was post-carbonized at 0.95 of stretching ratio for obtaining a post-carbonized fiber. Then, in an ammonium bicarbonate aqueous solution, a surface anodizing treatment was performed on the post-carbonized fiber with an electric quantity of 12 C/g for obtaining the carbon fiber of embodiment 1. The carbon fiber was evaluated by the following evaluation methods and the evaluated results were shown in Table 1.

Embodiments 2 to 3 and Comparative Embodiment 1

Embodiments 2 to 3 and comparative embodiment 1 were practiced with the same method as in embodiment 1 by using various purities of the acrylonitrile monomer, i.e., contents of impurities. Specific conditions and evaluated results of embodiments 2 to 3 and comparative embodiment 1 were shown in Table 1.

TABLE 1

| | | embodiment | | | comparative embodiment |
|---|---|---|---|---|---|
| | | 1 | 2 | 3 | 1 |
| composition of acrylonitrile monomer | acrylonitrile (wt. %) | 99.992 | 99.994 | 99.938 | 99.554 |
| | water (ppm) | 48 | 63 | 571 | 4278 |
| | methylpropenenitrile (ppm) | <1 | 1.3 | <1 | 83.4 |
| | propionylnitrile (ppm) | <1 | <1 | <1 | 30.8 |
| | oxazole (ppm) | <2 | <2 | <2 | 16.5 |
| | 4-methoxyphenol (ppm) | 34.9 | <1 | 38.2 | 40.7 |
| | butanone (ppm) | <2 | <2 | <2 | 10.2 |
| | (meth)acrylic acid alkyl ester (ppm) | <1 | <1 | <1 | 5.7 |
| | iron (ppm) | <0.001 | <0.001 | <0.001 | <0.001 |
| | copper (ppm) | <0.002 | <0.002 | <0.002 | <0.002 |
| acrylonitrile copolymer | falling-ball viscosity (second) | 630 | 620 | 600 | 520 |
| | weight-average molecular weight (g/mole) | 423000 | 419000 | 392000 | 376000 |
| | molecular weight distribution (Mw/Mn) | 2.0 | 2.1 | 2.6 | 3.2 |
| carbon fiber | strength (KSI) | 780 | 762 | 710 | 650 |
| | inner pore diameter (nm) | 8.0 | 8.2 | 9.1 | 10.6 |

Note:
The term "weight percent (wt. %)" was based on the weight of the acrylonitrile monomer as 100 wt. %. The term "ppm" was based on the content of the acrylonitrile monomer as $1 \times 10^6$ ppm.

Evaluation Methods

1. Test of Falling-Ball Viscosity

In the test of the falling-ball viscosity, acrylonitrile copolymer was put into a test tube with a length of 30 cm and a diameter of 2 cm. After the test tube stood for 15 minutes at 45° C., a steel ball with a diameter of 0.1 cm was put into the acrylonitrile copolymer. A time took for the steel ball to fall naturally 20 cm was measured, and the time was used to present the falling-ball viscosity of the acrylonitrile copolymer.

2. Test of Weight-Average Molecular Weight (Mw)

In the test of the weight-average molecular weight, a gel permeation chromatography (GPC) was performed on the acrylonitrile copolymer, a retention time of the acrylonitrile copolymer was detected by a refractive index detector, and the retention time was substituted into an equation of a calibration curve for molecular weight, so as to obtain the weight-average molecular weight ($M_w$), number-average molecular weight ($M_n$) and the molecular weight distribution (i.e., a ratio of $M_w$ to $M_n$) via an interpolation, in which the test conditions can be those well-used by a person having ordinary skill in the art.

3. Test of Strength of Carbon Fiber

In the test of the strength of the carbon fiber, the tensile strength of the carbon fiber was measured by a tensile testing machine (manufactured by ZWICK Co., Ltd.), and an average from three data was used to evaluate the strength of the carbon fiber, in which parameter setting included a force with 5 N of pre-load and a testing speed of 50 mm/min, and a strain situation of the carbon fiber was detected by a 500 Kg of load cell.

4. Test of Inner Pore Diameter of Carbon Fiber

In the test of the inner pore diameter of the carbon fiber, in liquid nitrogen, a pore size analyzer based on a nitrogen adsorption method was used to determine a nitrogen adsorption-desorption isotherm for the carbon fiber. Then, accordingly to BET theory (Brunauer-Emmett-Teller theory), the pore size of the carbon fiber was calculated.

Referring to Table 1, in embodiments 1 to 3, the acrylonitrile monomer with a high purity was used, the resulted acrylonitrile copolymer had higher falling-ball viscosity, higher weight-average molecular weight, and narrower molecular weight distribution, and the carbon fibers produced by the acrylonitrile copolymers had higher strength and smaller inner pore diameter. In conclusion, the acrylonitrile copolymers with higher viscosity and higher weight-average molecular weight can be produced by the acrylonitrile monomer with a high purity, and the molecular weight distribution of the acrylonitrile copolymer was narrower. In the spinning operation, the acrylonitrile copolymer did not easily break up, so as to shorten processing time. Besides, the raw filament of the acrylonitrile copolymer made by the acrylonitrile copolymer had a compact structure, thus the inner pore diameter of the carbon fiber was reduced and the strength of the carbon fiber was enhanced.

In summary, in an application of the method for producing the carbon fiber of the present invention, in which the high pure acrylonitrile monomers with specific contents of the impurities and the comonomer are used to produce the acrylonitrile copolymer. The acrylonitrile copolymer is subjected to the spinning operation, the stretching operation, the oxidation treatment and the carbonization treatment in sequence, so as to obtain the carbon fiber. The acrylonitrile copolymer with the appropriate falling-ball viscosity and the appropriate weight-average molecular weight is beneficial to the spinning operation, thereby reducing the inner pore diameter and enhancing strength of the resulted carbon fiber.

Although the present invention has been disclosed in several embodiments as above mentioned, these embodiments do not intend to limit the present invention. Various changes and modifications can be made by those of ordinary skills in the art of the present invention, without departing from the spirit and scope of the present invention. Therefore, the claimed scope of the present invention shall be defined by the appended claims.

What is claimed is:

1. A method for producing a carbon fiber, comprising:
   mixing a copolymer solution of acrylonitrile copolymer consisting of an acrylonitrile monomer, a comonomer, an initiator and a solvent, and performing a polymerization, so as to obtain an acrylonitrile copolymer, wherein the acrylonitrile monomer includes impurities comprising water, methylpropenenitrile, propionylnitrile, oxazole, 4-methoxyphenol, butenone, iron, copper and (meth)acrylic acid alkyl ester, based on a weight of the acrylonitrile monomer as 100 weight percent (wt. %), a content of the acrylonitrile is more than 99.93 wt. %, and based on the content of the acrylonitrile monomer as $1 \times 10^6$ ppm, a content of the water is more than or equal to 48 ppm and less than 70 ppm, a content of the methylpropenenitrile is less than 2 ppm, a content of the propionylnitrile is less than 1 ppm, a content of the oxazole is less than 2 ppm, a content of the 4-methoxyphenol is less than 40 ppm, a content of the butenone is less than 2 ppm, a content of the iron is less than 0.001 ppm, a content of the copper is less than 0.002 ppm, and a content of the (meth)acrylic acid alkyl ester is less than 1 ppm, wherein based on a total weight of the acrylonitrile monomer and the comonomer as 100 wt. %, a content of the initiator is not more than 0.1 wt. %,
   performing a spinning operation on the acrylonitrile copolymer, so as to obtain a raw filament of the acrylonitrile copolymer, wherein a falling-ball viscosity of the acrylonitrile copolymer is 620 seconds to 700 seconds, and a molecular weight distribution of the acrylonitrile copolymer is less than 2.2;
   performing a stretching operation on the raw filament of the acrylonitrile copolymer, so as to obtain a carbon fiber precursor;
   performing an oxidation treatment on the carbon fiber precursor, so as to obtain an oxidized fiber; and
   performing a carbonization treatment on the oxidized fiber, so as to obtain the carbon fiber.

2. The method for producing the carbon fiber of claim 1, wherein based on the total weight of the acrylonitrile monomer and the comonomer as 100 wt. %, a content of the acrylonitrile monomer is 98.0 wt. % to 99.8 wt. %, and a content of the comonomer is 0.2 wt. % to 2.0 wt. %.

3. The method for producing the carbon fiber of claim 1, wherein the comonomer comprises itaconic acid.

4. The method for producing the carbon fiber of claim 1, wherein a content of the solvent is three to eight times of the total weight of the acrylonitrile monomer and the comonomer.

5. The method for producing the carbon fiber of claim 1, wherein the polymerization is performed at 60° C. to 70° C. for 4 hours to 6 hours, heated to 70° C. to 80° C. for 1 hour to 3 hours, and maintained for 7 hours to 9 hours.

6. The method for producing the carbon fiber of claim 1, wherein a weight-average molecular weight of the acrylonitrile copolymer is 380,000 g/mole to 450,000 g/mole.

7. The method for producing the carbon fiber of claim 1, wherein a total stretching ratio of the raw filament of the acrylonitrile copolymer is 11.2 to 12.8 after the stretching operation.

8. The method for producing the carbon fiber of claim 1, after the stretching operation, further comprising:
coating a finishing oil on the carbon fiber precursor, so as to obtain an oil coated carbon fiber precursor.

9. The method for producing the carbon fiber of claim 8, further comprising:
performing a drying operation on the oil coated carbon fiber precursor, so as to obtain a dried carbon fiber precursor.

10. The method for producing the carbon fiber of claim 1, wherein the oxidation treatment is performed at 200° C. to 300° C.

11. The method for producing the carbon fiber of claim 1, wherein a stretching ratio of the carbon fiber precursor after the oxidation treatment is 0.7 to 0.9 in comparison with an original length of the carbon fiber precursor before the oxidation treatment.

12. The method for producing the carbon fiber of claim 1, after the carbonization treatment, further comprising:
performing a surface oxidation treatment on the carbon fiber, so as to obtain a surface treated carbon fiber.

13. The method for producing the carbon fiber of claim 1, wherein an inner pore diameter of the carbon fiber is less than 10 nm.

14. A method for producing a carbon fiber, comprising:
mixing a copolymer solution of acrylonitrile copolymer consisting of an acrylonitrile monomer, a comonomer, an initiator and a solvent, and performing a polymerization, so as to obtain an acrylonitrile copolymer, wherein the acrylonitrile monomer includes impurities comprising water, methylpropenenitrile, propionylnitrile, oxazole, 4-methoxyphenol, butenone, iron, copper and (meth)acrylic acid alkyl ester, based on a weight of the acrylonitrile monomer as 100 weight percent (wt. %), a content of the acrylonitrile is more than 99.93 wt. %, and based on the content of the acrylonitrile monomer as $1 \times 10^6$ ppm, a content of the water is more than or equal to 48 ppm and less than 70 ppm, a content of the methylpropenenitrile is less than 2 ppm, a content of the propionylnitrile is less than 1 ppm, a content of the oxazole is less than 2 ppm, a content of the 4-methoxyphenol is less than 40 ppm, a content of the butenone is less than 2 ppm, a content of the iron is less than 0.001 ppm, a content of the copper is less than 0.002 ppm, and a content of the (meth)acrylic acid alkyl ester is less than 1 ppm; and based on a total weight of the acrylonitrile monomer and the comonomer as 100 wt. %, a content of the comonomer is 0.2 wt. % to 2.0 wt. %, and a content of the initiator is not more than 0.1 wt. %;
performing a spinning operation on the acrylonitrile copolymer, so as to obtain a raw filament of the acrylonitrile copolymer, wherein a falling-ball viscosity of the acrylonitrile copolymer is 620 seconds to 650 seconds, and a molecular weight distribution of the acrylonitrile copolymer is less than 2.2;
performing a stretching operation on the raw filament of the acrylonitrile copolymer, so as to obtain a carbon fiber precursor;
performing an oxidation treatment on the carbon fiber precursor, so as to obtain an oxidized fiber; and
performing a carbonization treatment on the oxidized fiber, so as to obtain the carbon fiber.

15. The method for producing the carbon fiber of claim 14, wherein an inner pore diameter of the carbon fiber is less than 10 nm, and tensile strength of the carbon fiber is more than 650 KSI.

* * * * *